(12) United States Patent
Ahn et al.

(10) Patent No.: US 7,850,870 B2
(45) Date of Patent: Dec. 14, 2010

(54) CONDUCTIVE CURABLE COMPOSITIONS

(75) Inventors: Dongchan Ahn, Midland, MI (US); Mark David Fisher, Midland, MI (US); Andrew Anthony Mojica, Freeland, MI (US)

(73) Assignee: Dow Corning Corporation, Midland, MI (US)

(*) Notice: Subject to any disclaimer, the term of this patent is extended or adjusted under 35 U.S.C. 154(b) by 190 days.

(21) Appl. No.: 11/659,459

(22) PCT Filed: Oct. 4, 2005

(86) PCT No.: PCT/US2005/035834

§ 371 (c)(1), (2), (4) Date: Feb. 2, 2007

(87) PCT Pub. No.: WO2006/049792

PCT Pub. Date: May 11, 2006

(65) Prior Publication Data

US 2007/0246245 A1    Oct. 25, 2007

Related U.S. Application Data

(60) Provisional application No. 60/622,756, filed on Oct. 28, 2004.

(51) Int. Cl.
*H01B 1/00* (2006.01)
(52) U.S. Cl. ............... 252/500; 252/518.1; 252/519.52; 502/123; 502/150; 523/427; 524/857; 526/196; 526/197; 526/217
(58) Field of Classification Search ............... 252/500, 252/518.1, 519.52; 502/150, 123; 523/427; 526/217, 197, 196; 524/495, 857
See application file for complete search history.

(56) References Cited

U.S. PATENT DOCUMENTS

| | | | |
|---|---|---|---|
| 2,676,182 A | | 4/1954 | Daudt et. al. |
| 3,231,542 A | | 1/1966 | Elsinger et al. |
| 3,275,611 A | * | 9/1966 | Fields et al. ................. 526/197 |
| 3,855,171 A | * | 12/1974 | Wegehaupt et al. ......... 524/857 |
| 4,584,355 A | | 4/1986 | Blizzard et al. |
| 4,585,836 A | | 4/1986 | Homan et al. |
| 4,591,622 A | | 5/1986 | Blizzard et al. |
| 4,690,967 A | | 9/1987 | LaGarde et al. |
| 4,699,966 A | | 10/1987 | Harris et al. |
| 5,310,835 A | | 5/1994 | Skoultchi et al. |
| 5,380,527 A | | 1/1995 | Legrow et al. |
| 5,536,947 A | | 7/1996 | Klersy et al. |
| 5,539,070 A | | 7/1996 | Zharov et al. |
| 6,121,165 A | | 9/2000 | Mackey et al. |
| 6,169,142 B1 | | 1/2001 | Nakano et al. |
| 6,361,716 B1 | | 3/2002 | Kleyer et al. |
| 6,380,301 B1 | | 4/2002 | Enami et al. |
| 6,403,697 B1 | * | 6/2002 | Mitsunaga et al. .......... 524/495 |
| 6,433,057 B1 | | 8/2002 | Bhagwagar et al. |
| 6,489,380 B1 | * | 12/2002 | Zhou et al. .................. 523/427 |
| 6,521,431 B1 | | 2/2003 | Kiser et al. |
| 6,534,581 B1 | | 3/2003 | Kleyer et al. |
| 6,620,515 B2 | | 9/2003 | Feng et al. |
| 6,699,929 B2 | | 3/2004 | Musa et al. |
| 6,706,831 B2 | | 3/2004 | Sonnenschein et al. |
| 6,762,260 B2 | | 7/2004 | Sonnenschein et al. |
| 6,777,512 B1 | | 8/2004 | Sonnenschein et al. |
| 6,791,839 B2 | | 9/2004 | Bhagwagar |
| 6,806,330 B1 | | 10/2004 | Sonnenschein et al. |
| 6,825,298 B2 | | 11/2004 | Sonnenschein et al. |
| 7,247,596 B2 | * | 7/2007 | Jialanella et al. ............ 502/123 |
| 2002/0028894 A1 | | 3/2002 | Sonnenschein et al. |
| 2003/0064255 A1 | | 4/2003 | Dannenberg |
| 2003/0064256 A1 | | 4/2003 | Sadvary et al. |

(Continued)

FOREIGN PATENT DOCUMENTS

EP        1 101 798 B1       8/2003

(Continued)

OTHER PUBLICATIONS

U.S. Appl. No. 60/815,049, filed Jun. 20, 2006, Ahn, Donchan, et al.

(Continued)

*Primary Examiner*—Mark Kopec
*Assistant Examiner*—Khanh Tuan Nguyen
(74) *Attorney, Agent, or Firm*—Howard & Howard Attorneys PLLC

(57) ABSTRACT

Conductive curable compositions contain a free radical polymerizable monomer, oligomer or polymer (i); an organoborane amine complex (ii), and an electrically or thermally conductive filler (iii). The conductive curable compositions can also contain an amine reactive compound having amine reactive groups (iv); and (v) a component capable of generating a gas when mixed with a compound bearing active hydrogen and a catalyst. The electrically conductive curable compositions can be used in composite articles of manufacture in which substrates are coated or bonded together with the composition and cured; and as electrically conductive rubbers, electrically conductive tapes, electrically conductive adhesives, electrically conductive foams, and electrically conductive pressure sensitive adhesives. The thermally conductive compositions can also be used in composite articles of manufacture in which substrates are coated or bonded together with the composition and cured, and as thermal interface materials, thermally conductive rubbers, thermally conductive tapes, thermally conductive adhesives, thermally conductive foams, thermally conductive seals and gaskets, and thermally conductive pressure sensitive adhesives.

23 Claims, No Drawings

U.S. PATENT DOCUMENTS

| | | |
|---|---|---|
| 2003/0175333 A1 | 9/2003 | Shefer et al. |
| 2003/0181611 A1* | 9/2003 | Sonnenschein et al. ..... 526/217 |
| 2003/0228973 A1* | 12/2003 | Moren ........................ 502/150 |
| 2004/0210015 A1 | 10/2004 | Sonnenschein et al. |
| 2004/0220363 A1 | 11/2004 | Sonnenschein |
| 2004/0242812 A1 | 12/2004 | Sonnenschein et al. |

FOREIGN PATENT DOCUMENTS

| | | |
|---|---|---|
| GB | 1156653 | 7/1969 |
| WO | WO 2004/020363 A2 | 3/2004 |
| WO | WO 2005/017005 A1 | 2/2005 |
| WO | WO 2005/017006 A1 | 2/2005 |
| WO | WO 2005/044867 A1 | 5/2005 |
| WO | WO 2006/07696 A1 | 7/2006 |
| WO | WO 2006/073695 A1 | 7/2006 |
| WO | WO 2006/088571 A1 | 8/2006 |

OTHER PUBLICATIONS

U.S. Appl. No. 60/719,296, filed Jun. 21, 2005, Ahn, Dongchan.

U.S. Appl. No. 60/879,459, filed Jan. 9, 2007, Ahn, Dongchan, et al.

* cited by examiner

US 7,850,870 B2

CONDUCTIVE CURABLE COMPOSITIONS

CROSS REFERENCE TO RELATED APPLICATIONS

This application is a U.S. national stage filing under 35 U.S.C. §371 of PCT Application No. PCT/US05/035834 filed on 4 Oct. 2005, currently pending, which claims the benefit of U.S. Provisional Patent Application No. 60/622,756 filed on 28 Oct. 2004 under 35 U.S.C. §119 (e). PCT Application No. PCT/US05/035834 and U.S. Provisional Patent Application No. 60/622,756 are hereby incorporated by reference.

DESCRIPTION

This invention is directed to conductive curable compositions containing organoborane amine complexes that can be cured at low temperatures. Curing is defined herein as a chemical or physical reaction such as polymerization or crosslinking that results in an increase in average molecular weight of the polymerizable component, such that the composition thickens or hardens. Conductive is defined herein as meaning that the curable composition can be electrically conductive, thermally conductive, or both electrically conductive and thermally conductive.

The invention is also directed to a composite article that includes the conductive curable composition. A further aspect of the invention relates to conductive organosilicon compositions that can be cured at low temperatures, rendered conductive without the need of heating, and wherein the composition contains a free radical polymerizable organopolysiloxane compound.

In addition, the invention is directed to methods of making composite articles where the conductive curable composition takes the form of an adhesive that can be processed at a temperature lower than temperatures previously employed, such that the adhesive is conductive, and the substrate to which the adhesive is applied and the adhesive composition, bond together at a lower temperature to make composite articles.

Polymeric based electrically conductive compositions and their uses are known, including electrically conductive organopolysiloxane containing compositions. For example, U.S. Pat. No. 6,433,057 (Aug. 13, 2002) describes addition curable electrically conductive silicone adhesive compositions that contain one or more polydiorganosiloxanes containing at least two alkenyl groups per molecule, an organohydrogen polysiloxane having an average of at least two silicon bonded hydrogen atoms, an electrically conductive filler, and a hydrosilylation catalyst.

However, the hydrosilylation process for curing the materials is limited, because hydrosilylation catalysts such as platinum are susceptible to poisoning or inhibition by small quantities of compounds containing nitrogen, phosphorous, sulfur, tin, and arsenic that strongly associate with the catalysts. Also, the presence of active hydrogen as alcohols, acids, and even water, can react with the organohydrogen polysiloxane, to create undesirable side reactions. Therefore, surface treatment agents and impurities introduced during the process tend to reduce the cure rate, or the resulting physical properties in hydrosilylation curable compositions. As a result, it is necessary to use higher temperatures, i.e., 120-175° C., for extended lengths of time, i.e., two hours at 120° C. in order to develop well-cured parts having sufficient adhesion and conductivity.

Electrically conductive organosilicon compositions using condensation curing catalysts are also known. For example, U.S. Pat. No. 6,534,581 (Mar. 18, 2003) describes compositions containing an organopolysiloxane with silicon bonded hydroxy groups, a crosslinking agent, an electrically conductive filler, and a condensation type catalyst. These compositions do not contain an easily poisoned platinum group catalyst, and so condensation curing organosilicon compositions offer the advantage of lower temperature curing. However, condensation curing requires the diffusion of moisture and so condensation curable compositions can take a significantly longer time to cure in confined geometries or in deep sections. The '581 patent notes that the compositions can be cured in about 10-20 hours at room temperature, and in less than about 16 hours at 70° C. In many applications, however, such as assembly and packaging of electronic products, extended cure times introduce costly delays in the manufacturing process. Further, condensation curable compositions can generate volatile by-products such as alcohols, that lead to the formation of voids from out-gassing.

Thermally conductive organosilicon compositions using addition (hydrosilylation) curable, condensation curable, and free radically curable catalysts are likewise known. For example, U.S. Pat. No. 6,380,301 (Apr. 30, 2002) describes certain thermally conductive silicone rubbers containing a curable organopolysiloxane, a curing agent, and fillers prepared by treating the surfaces of thermally conductive fillers with siloxane oligomers. However, the hydrosilylation and condensation curable compositions suffer from the same drawbacks noted above. When the silicone composition is free radical curable, the use of a catalyst such as an organic peroxide requires a high temperatures to initiate the cure, or has limited storage stability at ambient conditions. Further, free radical cures initiated by organic peroxides are easily inhibited in the presence of atmospheric oxygen, leading to uncured or poorly cured products, or suffer from undesirable decomposition by-products.

Organoborane amine complexes are also known. For example, organoborane amine complexes used for the polymerization of acrylic monomers is described in U.S. Pat. No. 3,275,611 Sep. 27, 1966). Certain organoboron compounds such as trialkylboranes by themselves, however, are pyrophoric in the presence of oxygen, so preformed complexes between the organoboron compounds and amine compounds are required to have the benefit of imparting improved stability to organoboron compounds such as the trialkylboranes.

Recent modifications on the structure of organoborane amine complexes are described in U.S. Pat. No. 6,706,831 (Mar. 16, 2004), as well as their use in acrylate based adhesives. The combination of alkylborane amine complexes with amine reactive decomplexing agents to initiate polymerization of acrylic adhesives at room temperature, is also described. While such compositions offer the advantage of rapid cure and adhesion to low energy plastics, the compositions are not electrically or thermally conductive, and no mention is made of the use of electrically or thermally conductive particles in compositions polymerized by alkylborane amine complexes.

U.S. Pat. No. 6,777,512 (Aug. 17, 2004), referred to hereafter as the '512 patent, describes certain polymerizable silicone compositions containing an aminoborane amine complex, one or more compounds having unsaturation capable of free radical polymerization, combined with compounds having a siloxane backbones and reactive moieties capable of cure, and a catalyst for curing the siloxane. While such compositions offer the advantage of forming addition curable products with good adhesion to low energy substrates without inhibition problems associated with hydrosilylation curable compositions, the compositions in the '512 patent are not electrically or thermally conductive.

Furthermore, because high temperatures are needed to develop adhesion and conductivity with existing addition curable compositions, the out-gassing of entrained volatile materials such as water from these polymeric compositions leads to the formation of undesirable voids or bubbles in joint formed between the silicone based elastomer and the substrate to which it is applied. This problem is particularly acute with hygroscopic, polar polymeric compositions such as polyesters, polyamides, polyimides, and epoxy resins. To overcome the problem, the components used to make the compositions often require pre-drying that entails some additional process steps and drying equipment in manufacturing processes. Also, the curing temperatures needed for addition curing of organosilicon compositions exceed the thermal stability limits of some polymeric substrates and components mounted thereon.

While there exist other examples of external treatment methods for the surfaces of components such as application of a primer or exposure to high energy sources such as plasma, corona, or ultraviolet light, even these treatment methods require additional processing time, and/or costly equipment in manufacturing processes.

In contrast to the above, the invention herein involves the discovery of certain curable compositions able to polymerize and/or crosslink rapidly even at low temperatures, yielding conductive curable compositions. Another aspect of the invention relates to compositions cured by this technique that offer unique physical properties attributed by silicon-based matrices with improved adhesion over conventional addition curable organosilicon compositions.

Due to deficiencies associated with compositions of the prior art noted above, there is a need for compositions that cure rapidly at lower temperatures and/or shorter times, and that form conductive curable compositions, while at the same time eliminating the need of pre-drying and external treatments of surfaces to which the compositions are applied.

Also, due to deficiencies associated with organopolysiloxane based conductive elastomers noted above, there is a need for compositions that cure rapidly and that develop electrical or thermal conductivity at reduced temperatures and/or shorter times, while still offering unique advantages in properties attributed by organosilicon based matrices.

Accordingly, the invention is directed to conductive curable compositions containing (i) a free radical polymerizable monomer, oligomer or polymer; (ii) an organoborane amine complex, and (iii) an electrically or thermally conductive filler. The free radical polymerizable monomer, oligomer, or polymer can be (a) an organic compound or (b) an organosilicon monomer, oligomer, or polymer containing unsaturation, and capable of undergoing free radical polymerization. The organoborane amine complex is a complex formed between an organoborane and an amine compound. The organoborane has the formula B—R''$_3$ where R'' represents linear, branched, aliphatic, or aromatic hydrocarbon groups containing 1-20 carbon atoms. The amine compound can be an organic amine or a silicon containing amine.

The electrically conductive filler (iii) can be a metal or a conductive non-metal; or metal or non-metal particles having an outer surface of a metal, with the outer surface metal being a noble metal such as silver, gold, platinum, palladium, and alloys thereof, or a base metal such as nickel, aluminum, copper, or steel. The particles can have an average particle size of 0.005-20 µm. Particles having an outer surface of a metal can have an average particle size of 5-100 µm. The particles can also have an outer surface of a metal with a core of particles consisting of copper, solid glass, hollow glass, mica, nickel, ceramic fiber or polymeric such as polystyrene and polymethylmethacrylate. The thermally conductive filler (iii) can be a metal particle, metal oxide particle, thermally conductive non-metal powder, or combinations thereof. The thermally conductive filler can be aluminum, copper, gold, nickel, silver, alumina, magnesium oxide, beryllium oxide, chromium oxide, titanium oxide, zinc oxide, barium titanate, diamond, graphite, carbon or silicon nano-sized particles, boron nitride, aluminum nitride, boron carbide, titanium carbide, silicon carbide, and tungsten carbide.

The composition may contain (iv) an amine reactive compound having amine reactive groups such as mineral acids, Lewis acids, carboxylic acids, carboxylic acid derivatives, carboxylic acid metal salts, isocyanates, aldehydes, epoxides, acid chlorides, and sulphonyl chlorides. The amine reactive functional groups can be borne by organic molecules or organometallic compounds such as organosilanes, organopolysiloxanes, organotitanates, or organozirconates. The amine reactive compound can be monomeric, oligomeric, or polymeric. The amine reactive compound (iv) may contain free radical polymerizable groups such as acrylic acid or polyacrylic acid. In addition, the amine reactive compound (iv) can be attached to solid particles such as ground silica, precipitated silica, calcium carbonate, carbon black, carbon nanoparticles, silicon nanoparticles, barium sulfate, titanium dioxide, aluminum oxide, boron nitride, silver, gold, platinum, palladium, and alloys thereof, or base metals such as nickel, aluminum, copper, and steel.

If porous or microporous foamed products are desired, the conductive curable composition may also contain (v) a component capable of generating a gas (a) when it's mixed with compounds bearing active hydrogen (b) and a catalyst (c). While the three components a-c are required for producing foamed products, one or more of them may already be present in some conductive curable compositions. Component (a) can be a silicon hydride functional compound such as an organohydrogen polysiloxane, component (b) can be water, an alcohol, or a carboxylic acid, and component (c) can be platinum, a platinum group metal, tin, titanium, or zirconium.

The electrically conductive compositions are useful in composite articles of manufacture in which substrates are coated or bonded together with the curable composition and cured. They can also be used in the preparation of various electrically conductive rubbers, electrically conductive tapes, electrically conductive adhesives, electrically conductive foams, and electrically conductive pressure sensitive adhesives; especially where the rubber, tape, adhesive, or pressure sensitive adhesive, are electrically conductive silicone rubbers, electrically conductive silicone tapes, electrically conductive silicone adhesives, electrically conductive silicone foams, and electrically conductive silicone pressure sensitive adhesives.

The thermally conductive compositions are useful in composite articles of manufacture in which substrates are coated or bonded together with the curable composition and cured. The thermally conductive compositions can also be used to prepare thermal interface materials, thermally conductive rubbers, thermally conductive tapes, thermally conductive curable adhesives, thermally conductive foams, and thermally conductive pressure sensitive adhesives. They are especially useful for preparing thermally conductive silicone adhesives used as die attachment adhesives, solder replacements, and thermally conductive coatings and gaskets. The thermally conductive silicone adhesives are especially useful for bonding electronic components to flexible or rigid substrates.

These and other features of the invention will become apparent from a consideration of the description of the invention.

Conductive curable compositions herein contain (i) a free radical polymerizable monomer, oligomer, or polymer; (ii) an organoborane amine complex; and (iii) an electrically conductive filler in an amount needed to impart electrical conductivity to the composition, or a thermally conductive filler in an amount needed to impart thermal conductivity to the composition. Optionally, an effective amount of (iv) an amine reactive compound having amine reactive groups can be included in the composition. Component (iv) should be capable of causing the organoborane amine complex (ii) to dissociate. In compositions not containing component (iv), those compositions can be heated to temperatures sufficient to cause the organoborane amine complex (ii) to dissociate.

These curable compositions offer rapid cure at low temperatures and are at the same time conductive. When used as composite articles, the conductive curable compositions can be applied to at least one surface of a substrate. When used to manufacture composite articles in which the curable composition is conductive, the process can be conveniently carried out by bonding the conductive curable composition to at least one surface of the substrate at significantly lower temperatures, i.e., typically at room temperature (RT) of 20-25° C./68-77° F., and in a shorter time The Free Radical Polymerizable Monomer, Oligomer, or Polymer (i)

Component (i) can be an organic molecule or an organometallic molecule such as an organosilicon. It can be a single monomer, oligomer, polymer, or mixture, containing unsaturation and capable of undergoing free radical polymerization. In either case, it can be a single monomer, oligomer, or polymer containing unsaturation and capable of undergoing free radical polymerization. Mixtures of monomers, oligomers, and polymers can also be used. In many cases, it is preferred to use mixtures of monomer, oligomers, and polymers to impart the desired combination of physical properties such as viscosity, volatility, substrate wetting for processability and resolution in the uncured state, glass transition temperature, hardness or solubility, and surface properties such as hydrophilicity or hydrophobicity in the cured state. When component (i) is an organic compound, the compound selected will of course depend on the use of the cured product. Such compounds are described for example in U.S. Pat. No. 6,762,260 (Jul. 13, 2004). Some examples of suitable organic compounds are 2-ethylhexylacrylate, 2-ethylhexylmethacrylate, methylacrylate, methylmethacrylate, neopentylglycol diacrylate, neopentylglycoldimethacrylate, glycidyl acrylate, glycidyl methacrylate, allyl acrylate, allyl methacrylate, strearyl acrylate, stearyl methacrylate, tetrahydrofurfuryl acrylate, tetrahydrofurfuryl methacrylate, caprolactone acrylate, perfluorobutyl acrylate, perfluorobutyl methacrylate, 1H,1H,2H,2H-heptadecafluorodecyl acrylate, 1H,1H,2H,2H-heptadecafluorodecyl methacrylate, tetrahydroperfluoroacrylate, phenoxyethyl acrylate, phenoxyethyl methacrylate, bisphenol A acrylate, bisphenol A dimethacrylate, ethoxylated bisphenol A acrylate, ethoxylated bisphenol A methacrylate, hexafluoro bisphenol A diacrylate, hexafluoro bisphenol A dimethacrylate, diethyleneglycol diacrylate, diethyleneglycol dimethacrylate, dipropyleneglycol diacrylate, dipropyleneglycol dimethacrylate, polyethyleneglycol diacrylate, polyethyleneglycol dimethacrylate, polypropyleneglycol diacrylate, polypropyleneglycol dimethacrylate, trimethylolpropanetriacrylate, trimethylolpropanetrimethacrylate, ethoxylated trimethylolpropanetriacrylate, ethoxylated trimethylolpropanetrimethacrylate, pentaerythritol triacrylate, pentaerythritol trimethacrylate, pentaerythritol tetraacrylate, pentaerythritol tetramethacrylate, methyl-3-butenoate, allyl methyl carbonate, diallyl pyrocarbonate, allyl acetoacetate, diallyl carbonate, diallyl phthalate, dimethyl itaconate, diallyl carbonate, or combinations thereof. Other useful organic compounds include acrylate tipped polyurethane prepolymers prepared by reacting isocyanate reactive acrylate monomers, oligomers or polymers such as hydroxy acrylates with isocyanate functional prepolymers. Also useful are a class of conductive monomers, dopants, oligomers, polymers, and macromonomers having an average of at least one free radical polymerizable group per molecule, and the ability to transport electrons, ions, holes, and/or phonons. For example, reference may be had to U.S. Pat. No. 5,929,194 (Jul. 27, 1999) that describes the preparation of various free radical polymerizable hole transporting compounds such as 4,4'4"-tris[N-(3(2-acryloyloxyethyloxy)phenyl)-N-phenylamino]triphenylamine, 4,4'4"-tris[N-(3(benzoyloxyphenyl)-N-phenylamino]triphenylamine, and preparation of electroluminescent devices made there from.

When component (i) is an organosilicon compound, again the compound selected depends on the use of the cured product, but it is generally selected from among organosilanes and organopolysiloxanes having on average at least one free radical polymerizable moiety. The organosilicon compounds can be monomeric, oligomeric, polymeric, or they can include mixtures of monomers, and/or oligomers, and/or polymers. Higher molecular weight versions of such free radical polymerizable compounds are sometimes referred to as macromonomers. The organosilicon compounds can contain monofunctional or multifunctional units in the free radical polymerizable group. This allows for polymerization to linear polymers or crosslinked polymer networks. The monomers and oligomers can be any monomer or oligomer used to prepare addition or condensation curable polymers, or monomers or oligomers used in other types of curing reactions provided they have at least one free radical polymerizable group.

Suitable organosilicon monomers have structures corresponding to the formula $R_nSi(OR')_{4-n}$ where n is 0-4, and where at least one of the R or R' groups contain a free radical polymerizable group. The R and R' groups can be independently hydrogen, a halogen atom, or an organic group such as alkyl groups, haloalkyl groups, aryl groups, haloaryl groups, alkenyl groups, alkynyl groups, acrylate, and methacrylate functional groups. The R and R' groups may also contain other organic functional groups such as glycidyl groups, amine groups, ether groups, cyanate ester groups, isocyano groups, ester groups, carboxylic acid groups, carboxylate salt groups, succinate groups, anhydride groups, mercapto groups, sulfide groups, azide groups, phosphonate groups, phosphine groups, masked isocyano groups, and hydroxyl groups.

Some examples of free radical polymerizable organosilicon monomers include 3-methacryloxypropyltrimethoxysilane, methacryloxymethyl trimethoxysilane, 3-methacryloxypropyltriethoxysilane, 3-acryloxypropyltrimethoxysilane, 3-methacryloxypropyltrimethylsilane, 3-acryloxypropyltriethoxysilane, 3-acryloxylpropyltrimethylsilane, vinyl trimethoxysilane, allyltrimethoxysilane, 1-hexenyltrimethoxysilane, tetra(allyloxysilane), tetra(3-butenyl-1-oxy)silane, tri(3-butenyl-1-oxy)methylsilane, di(3-butenyl-1-oxy)dimethylsilane, and 3-butenyl-1-oxy trimethylsilane. Preferred free radical polymerizable moieties for these organosilicon compounds are aliphatic unsaturated groups in which the double bond is located at terminal positions, internal positions, or both positions relative to the functional group. The most preferred free radical polymerizable moiety for the organosilicon compounds are acrylate groups or methacrylate groups.

When the free radical polymerizable organosilicon compound is an organopolysiloxane monomer, oligomer, or polymer, the compound can be an organopolysiloxane having linear, branched, hyperbranched, or resinous structures. The compound can be homopolymeric or copolymeric. The free radical polymerizable moiety for the organopolysiloxane can be an unsaturated organic group such as an alkenyl group having 2-12 carbon atoms exemplified by vinyl, allyl, butenyl, and hexenyl groups. The unsaturated organic groups can also consist of alkynyl groups having 2-12 carbon atoms exemplified by ethynyl, propynyl, and butynyl groups. The unsaturated organic group can bear the free radical polymerizable group on oligomeric or polymeric polyethers such as allyloxypoly(oxyalkylene) groups and halogen substituted analogs thereof. The free radical polymerizable organic groups can contain acrylate or methacrylate functional groups exemplified by acryloxyalkyl groups such as 3-acryloxypropyl and acryloxymethyl and methacryloxyalkyl groups such as 3-methacryloxypropyl and methacryloxymethyl. The unsaturated organic groups can be located at terminal positions, pendant positions, or both terminal and pendant positions relative to the polymer backbone. Preferred free radical polymerizable moieties for organopolysiloxanes are aliphatic unsaturated groups in which the double bond is located at a terminal position, an internal position, or both positions relative to the functional group. The most preferred free radical polymerizable moiety for monomeric, oligomeric, and polymeric organosilicon compounds are acrylate and methacrylate groups.

Any remaining silicon bonded organic groups can be monovalent organic groups free of aliphatic unsaturation. The monovalent organic group can have 1-20 carbon atoms, preferably 1-10 carbon atoms, and is exemplified by alkyl groups such as methyl, ethyl, propyl, pentyl, octyl, undecyl, and octadecyl; cycloalkyl groups such as cyclohexyl; aryl groups such as phenyl, tolyl, xylyl, benzyl, and 2-phenylethyl; alkyloxypoly(oxyalkylene) groups such as propyloxypoly(oxyethylene), propyloxypoly(oxypropylene), propyloxy-poly(oxypropylene)-co-poly(oxyethylene) groups, halogen substituted versions thereof; cyanofunctional groups such as cyanoalkyl groups exemplified by cyanoethyl and cyanopropyl; carbazole groups such as 3-(N-carbazolyl)propyl; arylamino-functional groups such as 4-(N, N-diphenylamino)phenyl-3-propyl; and halogenated hydrocarbon groups such as 3,3,3-trifluoropropyl, 3-chloropropyl, dichlorophenyl, and 6,6,6,5,5,4,4,3,3-nonafluorohexyl.

The free radical polymerizable organosilicon compound can be a fluid having a viscosity of 0.001 Pa·s at 25° C. to a compound having the consistency of a gum. The free radical polymerizable organosilicon compound can also be a solid that becomes flowable at elevated temperatures or by application of shear.

Component (i) includes organopolysiloxane fluids having the formulae:

(a) $R^1_3SiO(R^1_2SiO)_a(R^1R^2SiO)_bSiR^1_3$, (b) $R^3_2R^4SiO(R^3_2SiO)_c(R^3R^4SiO)_dSiR^3_2R^4$, or (c) combinations of such fluids.

In Formula (a), a has an average value of zero to 20,000 and b has an average value of 1-20,000. Each $R^1$ group is independently a monovalent organic group. Suitable monovalent organic groups include acrylic functional groups such as acryloxymethyl, acryloxypropyl, methacryloxymethyl and methacryloxypropyl groups; alkyl groups such as methyl, ethyl, propyl, and butyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkylene) groups such as allyloxy(polyoxyethylene), allyloxypoly(oxypropylene), and allyloxy-poly(oxypropylene)-co-poly(oxyethylene) groups; alkyloxypoly(oxyalkylene) groups such as propyloxy(polyoxyethylene), propyloxypoly(oxypropylene), and propyloxy-poly(oxypropylene)-co-poly(oxyethylene) groups; halogen substituted alkyloxypoly(oxyalkylene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as 3-glycidoxypropyl, 2-(3,4,-epoxycyclohexyl)ethyl, and 5,6-epoxyhexyl groups; ester functional groups such as acetoxymethyl and benzoyloxypropyl groups; hydroxyl functional groups such as hydroxy and 2-hydroxyethyl groups; isocyanate and masked isocyanate functional groups such as 3-isocyanatopropyl, tris-3-propylisocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carboxylic acid functional groups such as 3-carboxypropyl and 2-carboxyethyl groups; carbazole groups such as 3-(N-carbazolyl)propyl; arylamino-functional groups such as 4-(N,N-diphenylamino)phenyl-3-propyl; and metal salts of carboxylic acids such as the zinc, sodium, or potassium salts of 3-carboxypropyl and 2-carboxyethyl.

The $R^2$ group is independently an unsaturated monovalent organic group. $R^2$ is exemplified by alkenyl groups such as vinyl, allyl, and butenyl groups; alkynyl groups such as ethynyl and propynyl groups; and acrylic functional groups such as acryloxypropyl and methacryloxypropyl groups.

In Formula (b), c has an average value of zero to 20,000 and d has an average value of zero to 20,000. The $R^3$ groups can be the same as the $R^1$ groups noted above. Each $R^4$ is independently an unsaturated organic hydrocarbon group. $R^4$ is exemplified by alkenyl groups such as vinyl, allyl, and butenyl groups; alkynyl groups such as ethynyl and propynyl groups; alkenyloxypoly(oxyalkylene) groups such as allyloxy(polyoxyethylene), allyloxypoly(oxypropylene), and allyloxy-poly(oxypropylene)-co-poly(oxyethylene) groups; and acrylic functional groups such as acryloxymethyl, acryloxypropyl, methacryloxymethyl and methacryloxypropyl groups.

Some representative organopolysiloxane fluids suitable for use as component (i) include α,ω-methacryloxypropyldimethylsilyl terminated polydimethylsiloxane, α,ω-methacryloxymethyl-dimethylsilyl terminated polydimethylsiloxanes, α, ω-acryloxypropyldimethylsilyl terminated polydimethylsiloxane, α, ω-acryloxymethyldimethylsilyl terminated polydimethylsiloxane, pendant acrylate and methacrylate functional polymers such as poly(acryloxypropyl-methylsiloxy)-polydimethylsiloxane and poly(methacryloxypropyl-methylsiloxy)-polydimethylsiloxane copolymers; and telechelic polydimethylsiloxanes having multiple acrylate or methacrylate functional groups such as compositions formed via Michael addition of multi-acrylate or multi-methacrylate monomers to amine terminated polydimethylsiloxanes. Such functionalizing reactions can be carried out a priori or in-situ.

It may be desirable to use a mixture of organopolysiloxane fluids differing in degree of functionality and/or the nature of the free radical polymerizable group. For example, the use of a hexa-functional telechelic polydimethylsiloxane prepared by Michael addition of N-(methyl)isobutyldimethylsilyl terminated polydimethylsiloxane having two molar equivalents of trimethylolpropane tri-acrylate as component (i) of the composition, provides a much faster cure rate and a reduced sol content relative to di functional methacryloxypropyldimethylsilyl terminated polydimethylsiloxanes of similar degree of polymerization (DP). However, the latter compositions allow better working time and produce a lower modulus elastomer. Hence, combinations of component (i) having different structures is preferred. Methods of preparing such organopolysiloxane fluids are known such as the hydrolysis and condensation of corresponding organohalosilanes or equilibration of cyclic polydiorganosiloxanes.

The symbols M, D, T, and Q used herein represent the functionality of structural units of polyorganosiloxanes including organosilicon fluids, rubbers (elastomers) and resins. The symbols are used in accordance with established understanding in the silicone industry. M represents the monofunctional unit $R_3SiO_{1/2}$; D represents the difunctional unit $R_2SiO_{2/2}$; T represents the trifunctional unit $RSiO_{3/2}$; and Q represents the tetrafunctional unit $SiO_{4/2}$. The structural formula of these units is shown below.

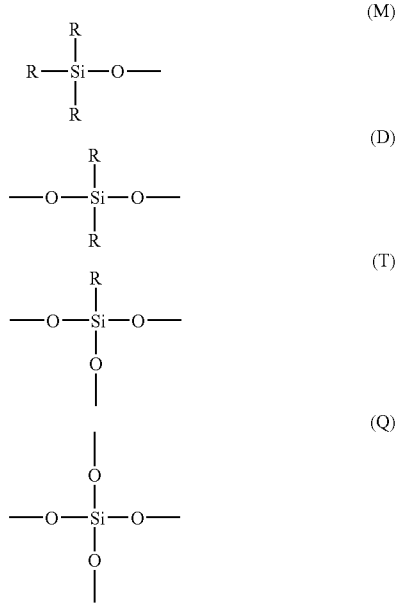

Component (i) may also be an organosiloxane resin such as MQ resins containing $R^5_3SiO_{1/2}$ units and $SiO_{4/2}$ units; TD resins containing $R^5SiO_{3/2}$ units and $R^5_2SiO_{2/2}$ units; MT resins containing $R^5_3SiO_{1/2}$ units and $R^5SiO_{3/2}$ units; MTD resins containing $R^5_3SiO_{1/2}$ units, $R^5SiO_{3/2}$ units, and $R^5_2SiO_{2/2}$ units, or combinations thereof.

Each $R^5$ group in these organosiloxane resins represents a monovalent organic group. The monovalent organic group $R^5$ can have 1-20 carbon atoms preferably 1-10 carbon atoms. Some examples of monovalent organic groups are acrylate functional groups such as acryloxyalkyl groups, methacrylate functional groups such as methacryloxyalkyl groups, cyano-functional groups, and monovalent hydrocarbon groups. Monovalent hydrocarbon groups include alkyl groups such as methyl, ethyl, propyl, pentyl, octyl, undecyl, and octadecyl groups; cycloalkyl groups such as cyclohexyl groups; alkenyl groups such as vinyl, allyl, butenyl, and hexenyl groups; alkynyl groups such as ethynyl, propynyl, and butynyl groups; aryl groups such as phenyl, tolyl, xylyl, benzyl, and 2-phenylethyl groups; halogenated hydrocarbon groups such as 3,3,3-trifluoropropyl, 3-chloropropyl, dichlorophenyl, and 6,6,6,5,5,4,4,3,3-nonafluorohexyl groups. The cyano-functional groups include cyanoalkyl groups such as cyanoethyl and cyanopropyl groups.

$R^5$ can also be an alkyloxypoly(oxyalkylene) group such as propyloxy(polyoxyethylene), propyloxypoly(oxypropylene) and propyloxy-poly(oxypropylene)-co-poly(oxyethylene) groups; halogen substituted alkyloxypoly(oxyalkylene) groups such as perfluoropropyloxy(polyoxyethylene), perfluoropropyloxypoly(oxypropylene) and perfluoropropyloxy-poly(oxypropylene)-co-poly(oxyethylene) groups; alkenyloxypoly(oxyalkylene) group such as allyloxypoly (oxyethylene), allyloxypoly(oxypropylene) and allyloxypoly(oxypropylene)-co-poly(oxyethylene) groups; alkoxy groups such as methoxy, ethoxy, n-propoxy, isopropoxy, n-butoxy and ethylhexyloxy groups; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; hindered aminoalkyl groups such as tetramethylpiperidinyl oxypropyl groups; epoxyalkyl groups such as 3-glycidoxypropyl, 2-(3,4,-epoxycyclohexyl)ethyl, and 5,6-epoxyhexyl groups; ester functional groups such as acetoxymethyl and benzoyloxypropyl groups; hydroxyl functional groups such as hydroxy and 2-hydroxyethyl groups; isocyanate and masked isocyanate functional groups such as 3-isocyanatopropyl, tris-3-propyl-isocyanurate, propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; carboxylic acid functional groups such as 3-carboxypropyl, 2-carboxyethyl, and 10-carboxydecyl groups; carbazole groups such as 3-(N-carbazolyl)propyl; arylamino-functional groups such as 4-(N, N-diphenylamino)phenyl-3-propyl; and metal salts of carboxylic acids such as zinc, sodium, and potassium salts of 3-carboxypropyl and 2-carboxyethyl.

The organosiloxane resins generally contain an average of 1-40 mole percent of free radical polymerizable groups such as unsaturated organic groups. The unsaturated organic groups may be alkenyl groups, alkynyl groups, acrylate-functional groups, methacrylate-functional groups, or combinations thereof. Mole percent of unsaturated organic groups in organosiloxane resins as defined herein is the ratio of the number of moles of unsaturated group containing siloxane units in a resin to the total number of moles of siloxane units in the resin multiplied by 100.

Some specific examples of suitable organosiloxane resins that are useful as component (i) are $M^{Methacryloxymethyl}Q$ resins, $M^{Methacryloxypropyl}Q$ resins, $MT^{Methacryloxymethyl}T$ resins, $MT^{Methacryloxypropyl}T$ resins, $MDT^{Methacryloxymethyl}T^{Phenyl}T$ resins, $MDT^{Methacryloxypropyl}T^{Phenyl}T$ resins, $M^{Vinyl}T^{Phenyl}$ resins, $TT^{Methacryloxymethyl}$ resins, $TT^{Methacryloxypropyl}$ resins, $T^{Phenyl}T^{Methacryloxymethyl}$ resins, $T^{Phenyl}T^{Methacryloxypropyl}$ resins, TT$^{Phenyl}$T$^{Methacryloxymethyl}$ resins, and TT$^{Phenyl}$T$^{Methacryloxypropyl}$ resins, where M, D, T, and Q have the same meanings as defined above.

Methods of preparing organosiloxane resins are known. For example, the resins can be made by treating a resin copolymer produced by a silica hydrosol capping process as described in U.S. Pat. No. 2,676,182 (Apr. 20, 1954) with an alkenyl containing endblocking reagent. The method in the '182 patent in particular involves the reaction of a silica hydrosol under acidic conditions with a hydrolyzable triorganosilane such as trimethylchlorosilane, a siloxane such as hexamethyldisiloxane, or a mixture thereof, and then recovering a copolymer having M and Q units. These copolymers typically contain 2-5 percent by weight of hydroxyl groups.

Organosiloxane resin containing less than 2 percent by weight of silicon bonded hydroxyl groups may then be prepared by reacting the copolymeric product of the '182 patent with an endblocking agent containing unsaturated organic groups and an endblocking agent free of aliphatic unsaturation in amounts sufficient to provide 3-30 mole percent of unsaturated organic groups in the product. Suitable endblocking agents include silazanes, siloxanes, and silanes. Some preferred endblocking agents are described in U.S. Pat. No. 4,584,355 (Apr. 22, 1986), U.S. Pat. No. 4,585,836 (Apr. 29, 1986), and U.S. Pat. No. 4,591,622 (May 22, 1986). A single endblocking agent or mixture of endblocking agents may be used to prepare these organosiloxane resin.

Another type of organosilicon compound that can be used as component (i) is a composition formed by copolymerizing organic compounds having polymeric backbones with organopolysiloxanes where an average of at least one free radical polymerizable group is incorporated per molecule. Suitable organic compounds include hydrocarbon based polymers such as polyisobutylene, polybutadienes, polyisoprenes; polyolefins such as polyethylene, polypropylene and polyethylene polypropylene copolymers; polystyrenes, styrene butadiene, and acrylonitrile butadiene styrene; polyacrylates; polyethers such as polyethylene oxide or polypropyleneoxide; polyesters such as polyethylene terephthalate or polybutylene terephthalate; polyamides; polycarbonates; polyimides; polyureas; polymethacrylates; polythiophenes; polypyrroles; polyanilines; polyacetylene; polyphenylene vinylene; polyvinylpyridenes; and partially fluorinated or perfluorinated polymers such as polytetrafluoroethylene; fluorinated rubbers; terminally unsaturated hydrocarbons; olefins; and polyolefins. The organic compound can also be a copolymer of any of the above polymers including polymers containing multiple organic functionality, multiple organopolysiloxane functionality, or combinations of organopolysiloxanes with organic compounds. The copolymeric structures can vary in their arrangement of repeating units from random, grafted, or blocky in nature.

In addition to bearing on average at least one free radical polymerizable group, component (i) may have a physical transition temperature or bear an organofunctional group with a physical transition temperature, or upon curing form a matrix that has a physical transition temperature, i.e., glass transition or melting transition, such that the composition undergoes changes marked by softening or non-linear reduction in viscosity on reaching certain temperatures under conditions of use. Such organopolysiloxane matrices are useful for thermally conductive phase change compositions. A suitable organopolysiloxane matrix is an organofunctional silicone wax. The wax can be an uncrosslinked organofunctional silicone wax, a crosslinked organofunctional silicone wax, or a combinations of such waxes. These silicone waxes are commercially available and are described in detail in U.S. Pat. No. 5,380,527 (Jan. 10, 1995); U.S. Pat. No. 6,121,165 (Sep. 19, 2000); and in U.S. Pat. No. 6,620,515 (Sep. 16, 2003). Organofunctional silicone waxes also bearing at least one free radical polymerizable group such as acrylate or methacrylate are useful to impart phase changes to the composition when used as component (i). It may also be desirable therefore to use a mixture of organic compounds, organosilicon compounds, and/or organopolysiloxane compounds as component (i).

The Organoborane Amine Complex (ii)

The organoborane amine complex (ii) is a complex formed between an organoborane, and a suitable amine compound that renders the complex stable at ambient conditions. The complex (ii) should be capable of initiating polymerization or crosslinking of component (i) by the introduction of an amine reactive compound and/or by heating. An example is an alkylborane amine complex formed from trialkylboranes and various amine compounds. While the preferred molar ratio can vary, the optimal molar ratio is typically between 1-10 nitrogen groups per B where B represents boron. Examples of trialkylboranes useful for forming component (ii) include trialkylboranes of the formula B—R"$_3$ where R" represents linear and branched aliphatic or aromatic hydrocarbon groups containing 1-20 carbon atoms. Some examples include trimethylborane, tri-n-butylborane, tri-n-octylborane, tri-sec-butylborane, tridodecylborane, and phenyldiethylborane.

Some examples of amine compounds useful to form the organoborane amine complex (ii) with the organoborane compounds include 1,3 propane diamine, 1,6-hexanediamine, methoxypropylamine, pyridine, and isophorone diamine. Other examples of amine compounds useful to form organoborane amine complexes are described in the '512 patent referred to above, as well as in U.S. Pat. No. 6,806,330 (Oct. 19, 2004).

Silicon containing amine compounds can also be used to form the organoborane amine complex including compositions such as 3-aminopropyltrimethoxysilane, aminomethyltrimethoxysilane, 3-aminopropyltriethoxysilane, aminomethyltriethoxysilane, 2-(trimethoxysilylethyl)pyridine, aminopropylsilanetriol, 3-(m-aminophenoxy)propyltrimethoxysilane, 3-aminopropyldiisopropylmethoxysilane, aminophenyltrimethoxysilane, 3-aminopropyltris(methoxyethoxethoxy)silane, N-(2-aminoethyl)-3-aminopropyltrimethoxysilane, N-(2-aminoethyl)aminomethyltrimethoxysilane, N-(6-aminohexyl)aminomethyltrimethoxysilane, N-(2-aminoethyl)-11-aminoundecyltrimethoxysilane, (aminoethylaaminomethyl)phenethyltrimethoxysilane, N-(2-aminoethyl)-3-aminopropylmethyldimethoxysilane, N-(2-aminoethyl)-3-aminoisobutylmethyldimethoxysilane, and (3-trimethoxysilylpropyl)diethylene-triamine.

Amine functional organopolysiloxanes are also useful for forming the organoborane amine complex (ii) including compounds described above in formulas (a) and (b), and those compounds described previously as organopolysiloxane resins. This is subject to the stipulation that the molecule contain at least one aminefunctional group, such as 3-aminopropyl, 2-aminoethyl, aminomethyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole.

Specific examples include terminal and/or pendant amine-functional polydimethylsiloxane oligomers and polymers, terminal and/or pendant amine-functional random, graft and block copolymers and co-oligomers of polydimethylsiloxane and poly(3,3,3 trifluoropropyl-methylsiloxane), terminal and/or pendant amine-functional random, graft and block copolymers and co-oligomers of polydimethylsiloxane and poly(6,6,6,5,5,4,4,3,3-nonfluorohexyl-methylsiloxane), and terminal and/or pendant amine-functional random, graft and block copolymers and co-oligomers of polydimethylsiloxane and polyphenymethylsiloxane. Other examples of useful compounds include resinous amine-functional siloxanes such as the amine-functional compounds described previously as organopolysiloxane resins.

Also useful to form the organoborane amine complex (ii) are other nitrogen containing compounds including N-(3-triethyoxysilylpropyl)-4,5-dihydroimidazole, ureidopropyltriethoxysilane, siloxanes of formulas similar to formulas (a) and (b) noted above, and those compounds described previously as organopolysiloxane resins in which at least one group is an imidazole, amidine, or ureido functional group. When the amine compound is polymeric, the molecular weight is not limited, except that it should be such as to maintain a sufficiently high concentration of boron to permit curing or polymerization of the composition. For example, in a two-part composition, the part containing the organoborane initiator may be diluted with other components of the composition, or it may consist of the initiator complex alone.

The Electrically Conductive Filler (iii)

Component (iii) is an electrically conductive filler such as a noble metal including silver, gold, platinum, palladium, and alloys thereof; base metals including nickel, aluminum, copper, and steel; non-metal particles such as carbon powders with varying graphitic content, carbon blacks, and carbon nanotubes; or metal or non-metal particles having an outer surface of a metal, with the outer surface metal being a noble metal such silver, gold, platinum, palladium, and alloys thereof, or a base metal such as nickel, aluminum, copper, and steel. The filler particles can be a powder or flakes having an average particle size of 0.005-20 µm. Filler particles in which only the outer surface is metallic typically have an average particle size of 5-100 µm. The core of such particles can be formed of any electrically conductive or insulator material that can support a surface of any of the metals, and that does not adversely affect the electrical properties of the electrically conductive curable composition. Some examples of suitable core materials are copper, solid glass, hollow glass, mica, nickel, ceramic fiber, or polymeric such as polystyrene or polymethylmethacrylate. The electrically conductive filler (iii) is not limited in its particle shape, and it can have an aspect ratio ranging from approximately spherical (aspect ratio of about 1:1) to highly elongated (aspect ratio of about 3,000:1).

When the electrically conductive filler (iii) is a metal particle in the form of flakes, the surface of the particles may be coated with a lubricant such as a fatty acid or a fatty acid ester. Such lubricants are typically introduced during the milling process used to produce the metal flakes from a metal powder to prevent the powder from cold welding or forming large agglomerates. Even when the flakes are washed with a solvent after milling, some lubricant may remain chemisorbed on the surface of the metal.

The electrically conductive filler (iii) can also be a filler prepared by treating the surfaces of the metal particles. Some suitable organosilicon compounds that can be used to treat surfaces of the metal particles include compounds typically used to treat silica fillers such as organochlorosilanes, organosiloxanes, organodisilazanes, and organoalkoxysilanes. Other suitable compounds that can be used to treat the surfaces of the metal particles include alkylthiols, fatty acids, titanates, titanate coupling agents, zirconate coupling agents, and combinations thereof.

Component (iii) can be a single electrically conductive filler or a mixture of two or more electrically conductive fillers that differ in composition, surface area, surface treatment, particle size, or particle shape.

Preferably, the electrically conductive filler (iii) is silver particles having the form of flakes. A particularly preferred electrically conductive filler is silver flake sold under the tradename RA-127 by the American Chemet Corporation, Chicago, Ill. This particular filler has a mean particle size of 3.9 µm, a surface area of 0.87 $m^2/g$, an apparent density of 1.55 $g/cm^3$, and a tap density of 2.8 $g/cm^3$.

The amount of component (iii) used in the electrically conductive composition of the invention should be sufficient to impart electrical conductivity to the composition. Typically, the amount of component (iii) is such that the composition has a volume resistivity less than about 1 Ω·cm. The exact amount of component (iii) depends on the desired electrical properties, the surface area of the filler, the density of the filler, the shape of the filler particles, the surface treatment of the filler, and the nature of other components in the electrically conductive composition. The amount of component (iii) is typically 0.5-80 percent by volume, preferably 15-50 percent by volume, or 1-10 percent by volume in the case of nanoparticulate fillers such as nanotubes, based on the total volume of the electrically conductive composition. When the amount of component (iii) is less than about 15 percent by volume, or less than about one percent by volume in the case of nanoparticulate fillers such as nanotubes, the composition will not have significant electrical conductivity. When the concentration of component (iii) is greater than about 80 percent by volume, the composition does not exhibit substantially improved conductivity.

Methods of preparing electrically conductive fillers (iii) suitable for use in curable compositions of the invention are known and many fillers are commercially available. For example, powders of silver, gold, platinum, palladium, and alloys are typically produced by chemical precipitation, electrolytic deposition, or cementation. Flakes of these metals are produced by grinding or milling metal powder in the presence of a lubricant such as a fatty acid or fatty acid ester. Particles having an outer surface of one of metal are typically produced by metallizing an appropriate core material using a method such as electrolytic deposition, electroless deposition, or vacuum deposition. When the electrically conductive filler (iii) is prepared by treating the surface of metal particles with an organosilicon compound, the metal particles should be treated prior to admixture with the other ingredients of the curable composition, or the metal particles should be treated in situ during preparation of the curable composition.

Electrically conductive curable compositions containing components (i), (ii) and (iii) may be polymerized or crosslinked thermally by heating them above the dissociation temperature of the organoborane amine complex, and exposing them to air or other oxygenated environment. The introduction of oxygen may occur before, during, after, or throughout the heating step, provided the conductive curable composition does not contain a substance capable of reacting under the process conditions with the amine groups that are used as a complexing agent, or added as a stabilizer for component (ii). If an amine reactive compound is present in the conductive curable composition with component (ii) as a filler treating agent, for example, then mixing of the components (i), (ii), and (iii), and their subsequent handling and storage, requires an environment that is substantially oxygen free prior to curing the composition.

The Thermally Conductive Filler (iii)

Component (iii) can also be a thermally conductive filler such as metal particles, metal oxide particles, thermally conductive non-metal powders and combinations thereof. Some examples of suitable thermally conductive fillers for component (iii) are metal particulates and powders such as aluminum, copper, gold, nickel, and silver; alumina, metal oxides such as magnesium oxide, beryllium oxide, chromium oxide, titanium oxide, and zinc oxide; barium titanate; diamond; graphite; carbon nanoparticles; silicon nanoparticles; metal nitrides such as boron nitride and aluminum nitride; metal carbides such as boron carbide, titanium carbide, silicon carbide, and tungsten carbide; and combinations thereof. When electrical insulating properties of the filler are required, metal oxide, metal nitride or metal carbide powders are preferred, especially powders of alumina. A single type of powder or a combination of two or more powders can be used as the thermally conductive filler (iii).

The thermally conductive filler (iii) can be a metal filler having a low melting point. Low melting point metal fillers are described in U.S. Pat. No. 6,791,839 (Sep. 14, 2004). These low melting point metal fillers are typically eutectic alloys, non-eutectic alloys, or pure metals. The low melting point metal fillers are generally of Bi, In, Sn, Ga, or alloys thereof. The low melting point metal fillers can also be of Ag, Au, Cd, Cu, Pb, Sb, Zn, or combinations thereof. Some examples of suitable low melting point metal fillers include In—Bi—Sn alloys, Sn—In—Zn alloys, Sn—In—Ag alloys, Sn—Ag—Bi alloys, Sn—Bi—Cu—Ag alloys, Sn—Ag—Cu—Sb alloys, Sn—Ag—Cu alloys, Sn—Ag alloys, Sn—Ag—Cu—Zn alloys, and combinations thereof. Such low melting point metal fillers are commercially available from Indium Corporation of America, Utica, N.Y.; Arconium, Providence, R.I.; and AIM Solder, Cranston, R.I.

The thermally conductive filler (iii) can be treated by coating the surface of the metal filler particles with at least one filler treating agent. Treating agents and treating methods are known and described in U.S. Pat. No. 6,169,142 (Jan. 2, 2001). Some representative organosilicon filler treating agents that can be used include compositions normally used to treat silica fillers such as organochlorosilanes, organosiloxanes, organodisilazanes, and organoalkoxysilanes such as $C_6H_{13}Si(OCH_3)_3$, $C_8H_{17}Si(OC_2H_5)_3$ $C_{10}H_{21}Si(OCH_3)_3$, $C_{12}H_{25}Si(OCH_3)_3$, $C_{14}H_{29}Si(OC_2H_5)_3$, and $C_6H_5CH_2CH_2Si(OCH_3)_3$. Other filler treating agents that can be used include alkylthiols, fatty acids, titanates, titanate coupling agents, zirconate coupling agents, and combinations thereof.

Treatment agents for alumina or passivated aluminum nitride fillers include alkoxysilyl functional alkylmethyl polysiloxanes such as partial hydrolysis condensates having the formula $R^6_xR^7_ySi(OR^8)_{(4-x-y)}$, cohydrolysis condensates, mixtures of condensates, or similar materials. In the formula, the hydrolyzable group would be a silazane, an acyloxy group, or an oximo group. In each case, the group tethered to Si such as $R^6$ is a long chain unsaturated monovalent hydrocarbon or a monovalent aromatic-functional hydrocarbon. $R^7$ and $R^8$ are monovalent hydrocarbon group of 1-4 carbon atoms. x is 1, 2, or 3, and y is 0, 1, or 2 with the proviso that x+y is 1, 2, or 3.

Some examples of commercially available thermally conductive fillers include CB-A20S and Al-43-Me aluminum oxide fillers of differing particle size of Showa Denko KK, Tokyo, Japan; and AA-04, AA-2, and AA 18 aluminum oxide fillers of Sumitomo Chemical Company, Tokyo, Japan. Silver fillers are available from Metalor Technologies USA Corporation, Attleboro, Mass. Boron nitride fillers are available from Advanced Ceramics Corporation, Cleveland, Ohio.

A combination of thermally conductive fillers having differing particle size and different particle size distribution may be used as component (iii). Thus, a first aluminum oxide having a large average particle size can be combined with a second aluminum oxide having a small average particle size, in a proportion so as to meet the closest packing theoretical distribution curve. This improves packing efficiency and can reduce the viscosity and enhance heat transfer.

Rounded or spherically shaped thermally conductive filler particles should be used to prevent the viscosity to increase to undesirable levels during high loadings of the thermally conductive filler in the conductive curable composition. The average particle size of the thermally conductive filler (iii) is preferably within the range of 0.01-100 µm. When alumina powder is used as the thermally conductive filler, it is preferably a mixture of a first spherical alumina filler and a second spherical or irregularly shaped alumina powder having a different, preferably smaller average particle size. The amount of the thermally conductive filler (iii) is typically added in an amount such that the conductive curable composition has a thermal conductivity of about 1 Watt per meter Kelvin or more.

Thermally conductive curable compositions containing components (i), (ii) and (iii) may be polymerized or crosslinked thermally by heating them above the dissociation temperature of the organoborane amine complex, and then exposing them to air or other oxygenated environment. The introduction of oxygen may occur before, during, after, or throughout the heating step, provided the conductive curable compositions do not contain a substance capable of reacting under the process conditions with the amine groups that are used as complexing agent, or added as a stabilizer for component (ii). If an amine reactive compound is present in the conductive curable composition with component (ii) as a filler treating agent, then mixing of the components (i), (ii), and (iii), and their subsequent handling and storage, requires an environment that is substantially oxygen free prior to curing the composition.

The Amine Reactive Compound Having Amine Reactive Groups (iv)

The conductive curable composition may contain an amine reactive compound (iv) that is capable of initiating the polymerization or crosslinking when mixed with the organoborane amine complex (ii) and exposed to an oxygenated environment. The presence of component (iv) allows the initiation of polymerization or crosslinking to occur at temperatures below the dissociation temperature of the organoborane amine complex (ii) including room temperature and below. To achieve storage stability in the presence of oxygen, it is preferred that components (ii) and (iv) be physically or chemically isolated. For example, a composition containing component (iv) can be rendered air stable by packaging it separately from component (ii) as a multi-component formulation. Alternatively, components (ii) and (iv) or both can be encapsulated, or delivered in separate phases. This can be accomplished by introducing one or both of components (ii) and (iv) in a solid form that prevents intimate mixing of components (ii) and (iv). Curing of the composition can be activated by (a) heating it above the softening temperature of the solid phase component or encapsulant, or (b) by introduction of a solubilizing agent that allows mixing of components (ii) and (iv). Components (ii) and (iv) can also be combined in a single container without significant polymerization or crosslinking by packaging the two components in a container where mixing conditions are anaerobic.

Examples of some amine reactive compounds having amine reactive groups (iv) that can rapidly initiate polymerization or cure in the presence of oxygen include mineral acids, Lewis acids, carboxylic acids, carboxylic acid derivatives such as anhydrides and succinates, carboxylic acid metal salts, isocyanates, aldehydes, epoxides, acid chlorides, and sulphonyl chlorides. Some suitable amine reactive compounds include acrylic acid, polyacrylic acid, methacrylic acid, polymethacrylic acid, methacrylic anhydride, polymethacrylic anhydride, undecylenic acid, oleic acid, isophorone diisocyanate monomers or oligomers, methacryloylisocyanate, 2-(methacryloyloxy)ethyl acetoacetate, undecylenic aldehyde, and dodecyl succinic anhydride.

For improved compatibility in conductive curable compositions herein containing organosiloxane matrices, it is preferred that the amine reactive compound be an organosilane or organopolysiloxane bearing amine reactive groups. Some examples include 3-isocyanatopropyltrimethoxysilane; isocyanatomethyltrimethoxysilane; 3-glycidoxypropyltrimethoxysilane; triethoxysilylpropyl succinic anhydride; propylsuccinic anhydride finctionalized linear, branched, resinous, and hyperbranched organopolysiloxanes; methylsuccinic anhydride functionalized linear, branched, resinous, and hyperbranched organopolysiloxanes; cyclohexenyl anhydride functional linear, resinous, and hyperbranched organopolysiloxanes; carboxylic acid finctionalized linear, branched, resinous, and hyperbranched organopolysiloxanes such as carboxydecyl terminated oligomeric or polymeric polydimethylsiloxanes; and aldehyde functionalized linear, branched, resinous, and hyperbranched organopolysiloxanes such as undecylenic aldehyde-terminated oligomeric or polymeric polydimethylsiloxanes. The '512 patent describes silicon containing compounds that can be used including certain compounds that release an acid when exposed to moisture. The '512 patent also describes other amine reactive compounds referred to as decomplexation agents.

In some cases it may be desirable to stabilize the conductive curable composition by attaching the amine reactive compound to the solid particles. This enables one to control the working time and it stabilizes the liquid phase containing the amine reactive compound against separation from the rest of the conductive curable composition during storage. Attachment can be accomplished by a number of known surface treatments either in-situ or a priori. Some surface treatment methods include for example pre-treating solid particles such as ground or precipitated silica, calcium carbonate, carbon black, carbon nanoparticles, silicon nanoparticles, barium sulfate, titanium dioxide, aluminum oxide, boron nitride, zinc oxide, silver, gold, platinum, palladium, and alloys thereof; or a base metal such as nickel, aluminum, copper, and steel; with a condensation reactive compound. This is followed by reaction of the pre-treated solid particles with a compound having amine reactive groups, or by the direct treatment of the pre-treated solid particles using amine reactive compounds that have hydrolyzable moieties. In such cases, it is preferred that the particles to which the amine reactive compounds are attached have a similar density to the polymerization medium to facilitate dispersion of the particles in the ink system.

Some examples of condensation reactive compounds that can be used include 3-isocyanatopropyltriethoxysilane, isocyanatomethyltriethoxysilane, 3-isocyanatopropyltrimethoxysilane, isocyanatomethyltrimethoxysilane, triethoxysilylundecanal, glycidoxypropyltrimethoxysilane, (triethoxysilyl)methylsuccinic anhydride, 3-(triethoxysilyl) propylsuccinic anhydride, and 2-(4-chlorosulfonylphenyl) ethyltrimethoxysilane. Attachment of the amine reactive compound to the solid particles can also be accomplished by mixing an acid functional compound with fillers having the appropriate surface functionality under conditions conducive to formation of an acid base complex, a hydrogen bonded complex, or an acid salt.

Some fillers usable as component (iii) such as silver particles are commercially available and are already pre-treated with surface treating agents referred to as lubricants, or can be obtained with impurities that contain amine reactive groups such as carboxylic acid. In this way, component (iii) and component (iv) can be delivered together in the form of a treated electrically or thermally conductive filler. The advantage obtained in that instance is that the reaction between the organoborane amine complex and the amine reactive groups on the filler can help remove the lubricant from the surface of the filler particles, and the result is that the electrical or thermal conductivity is improved. In one part formulations, it is beneficial to mix, package and store the components in a substantially oxygen free environment to avoid premature thickening.

It may also be advantageous for the sake of stability to use a combination of fillers containing amine reactive groups, and fillers that are inert with respect to amine compounds. For example, in a two part formulation, the filler (iii) that is inert with respect to amine compounds can be combined with the alkylborane amine complex (ii), while the filler (iii) bearing amine reactive groups can serve as both components (iii) and (iv) and packaged in a separate container from component (ii). In that case, component (i) could be included with either part of the formulation or with both parts. Alternatively, the amine reactive compound (iv) can be introduced under conditions that allow it to be delivered in the gas phase to a pre-mixed mold filled with a composition containing components (i) and (ii). This allows extended working time followed by rapid cure upon exposure to air.

The Component Capable of Generating a Gas (v)

Conductive curable compositions herein can be prepared as porous foams by including a component capable of generating a gas upon mixing. Some means of accomplishing this include adding to the composition (1) a silicon hydride functional compound, (2) a compound bearing active hydrogen such as water, alcohols, or carboxylic acids, and (3) a co-catalyst such as platinum or tin to facilitate the reaction between the silicon hydride and the active hydrogen. This generates hydrogen gas during the curing step and a foam is generated upon mixing. The resulting foamed compositions range from flexible foams to rigid foams depending on the silicon hydride, active hydrogen, and free radical polymerizable compound, that were used. The pore size distribution of the foam can be controlled by any known methods of foam generation to achieve any desired property such as modulus, density, and permeability.

Optional Components

Some optional components that can be included in the conductive curable compositions herein include adhesion promoters; crosslinking agents; combinations of polymers, crosslinking agents, and catalysts useful for providing a secondary cure of the matrix; polymers capable of extending, softening, reinforcing, toughening, modifying viscosity, or reducing volatility when mixed into the composition; extending and reinforcing fillers; spacers; dopants; quantum dots; dyes; pigments; UV stabilizers; aziridine stabilizers; void reducing agents; cure modifiers such as hydroquinone and hindered amines; free radical initiators such as organic peroxides and ozonides; comonomers such as organic acrylates and methacrylates; polymers; diluents; rheology modifiers; acid acceptors; antioxidants; oxygen scavengers; oxygen sponges; oxygen release agents; oxygen generators; heat stabilizers; flame retardants; silylating agents; foam stabilizers; surfactants; wetting agents; solvents; diluents; plasticizers; fluxing agents; and desiccants.

Conductive curable composition of the invention can be prepared by combining and mixing:

A. 1-50 parts by weight of a free radical polymerizable monomer, oligomer or polymer (i);

B. 0.1-50 parts by weight of an organoborane amine complex (ii) sufficient to cure the composition, the amount depending on the molecular weight of the complex and the number of boron atoms per molecule; either C. 0.5-80 percent by volume of an electrically conductive filler (iii) based on the total volume of the conductive curable composition sufficient to impart electrical conductivity to the curable composition; or C. 25-96 percent by weight of a thermally conductive filler (iii) based on the total weight of the conductive curable composition sufficient to impart thermal conductivity to the curable composition;

D. 0 to 50 parts by weight of an amine reactive compound having amine reactive groups (iv) sufficient to decomplex boron depending on the molecular weight of the compound;

E. 0 to 50 parts by weight of a component capable of generating gas (v) when mixed with a compound bearing active hydrogen and a catalyst; and F. 0 to 50 parts by weight of any optional ingredient(s); based on the total weight of the conductive curable composition.

The working time and extension of shelf stability of conductive curable compositions of the invention can be controlled by introducing additional amine compounds to increase the molar ratio of amine groups to boron atoms in the composition. The effective amount to be added depends on the amine:boron ratio used in component (i). It is preferred that the overall amine:boron ratio remain sufficiently low however to permit polymerization to occur. A suitable amine:boron ratio would be less than 10:1, preferably less than 4:1. When the amine reactive component is already present in the conductive curable composition, i.e., when residual carboxylic acid is present on the filler particles, higher levels of amine compounds should be added to neutralize or partially neutralize the amine reactive groups for storage stability. The amine compound may contain monofunctional or multifunctional amine groups, and it can be a primary amine, a secondary amine, and/or a tertiary amine. If desired, the amine compound can contain free radical polymerizable groups or another functional group such as a hydrolyzable group. The amine compound can be monomeric, oligomeric, or polymeric in nature. Amine groups on the compound may be borne on an organic, organosilicon, or organopolysiloxane compound.

Composite articles according to the invention preferably consist of conductive curable compositions, and can be disposed or applied to a single substrate or between multiple substrates. At least one surface of the substrate to which the conductive curable composition is applied should have a polymeric or largely inorganic surface. Any additional substrates can be organic, thermoplastic, thermosetting, metal, ceramic, or another suitable inorganic material. The substrate(s) can be multi-layered such as a printed circuit board in which case there is obtained improved adhesion between electrically or thermally conductive composition and the substrate or substrates of the composite article.

Composite articles are made by bonding the conductive curable composition to at least one surface of the substrate in the composite article. This is carried out by curing the composition at temperatures below 150° C. but preferably at room temperature, and achieving sufficient adherence such that the conductive curable composition and the substrate are bonded together securely to form the composite article.

The temperature at which the conductive curable composition can be cured such that the substrate and the conductive curable composition are bonded together will vary, depending on the particular resin component of the composition forming the substrate. Generally, the temperature will range from −100° C. to 300° C. However, depending on the particular resin component, the temperature limits of the range may vary. For example, the temperature can vary from a low temperature below −100° C. to an upper temperature greater than 300° C. This can occur when the polymeric substrate consists of a no polar plastic material such as unmodified syndiotactic polystyrene, polytetrafluoroethylene (PTFE), or a polyolefin such as polyethylene and polypropylene. In that case, the upper temperature for curing an addition curable composition is less than 300° C. However for maximum benefits, the temperature should range from −40° C. to 150° C., preferably from 0° C. to 100° C., and more preferably from 15° C. to 35° C.

When the polymeric substrate is a material such as glass reinforced polybutylene terephthalate (PBT), the upper temperature for curing the curable composition on the surface of the substrate may be less than 80° C. For maximum benefit, the temperature should range from −40° C. to 80° C., preferably from 0° C. to 60° C., and more preferably from 15° C. and 35° C. The time for curing the composition on the substrate can range from 5 seconds to 24 hours, preferably 30 seconds to 2 hours. This will assure that the composition is fully cured and fully adhered to the substrate. The curable composition can be applied to a substrate by meter mixing, extruding, and/or using robotic or manual application.

Fully bonded composite articles can be made by disposing the conductive curable composition onto at least one surface of the polymeric substrate at a temperature less than the boiling point of water (100° C.), and then concurrently curing the conductive curable composition and bonding it to the polymeric substrate(s). This obviates the need to pre-dry the substrate(s). Composite articles can also be cured and bonded in a similar fashion at room temperature that eliminates the need to use a curing oven.

As noted above, the conductive curable compositions herein can be used easily as multiple-component multi-part adhesives. Combinations of components (i), (ii), (iii) and (iv) may be used as parts of multi-component multi-part packages provided components (ii) and (iv) are kept separate from one another. Components (i)-(iv) can also be stored together in a 1-part formulation as long as oxygen is not present. For example, a portion of the free radical polymerizable monomer, oligomer or polymer (i), the organoborane amine complex (ii), and the electrically or thermally conductive filler (iii) can be packaged together in one part, while the remaining portion of the free radical polymerizable monomer, oligomer or polymer (i) and the amine reactive compound (iv) are packaged together in a second part. Alternatively, the electrically or thermally conductive filler (iii) can be treated with the amine reactive compound (iv) and packaged separately from the organoborane amine complex (ii).

When the conductive curable composition is to be used as a foam, it is desirable to isolate the blowing agent, the catalyst, or the component capable of generating a gas from one another. The judicious positioning of these components in multi-part packages provides improved storage stability. While there is no restriction on the mixing ratio between the components in multi-component formulations, it is generally preferred to maintain volume ratios between 0.05:1 and 20:1, and more preferably between 0.1:1 and 10:1 for two-part packages.

Mixing and dispensing of multi-component compositions can be carried out in several ways. For example, the compositions can be mixed at the desired volume ratio in air in a bag or through a pressurized gun. The '512 patent describes several devices capable of mixing and dispensing two-part compositions. It is beneficial to tailor the viscosity and density of two-part compositions to allow for their efficient mixing and dispensing. Fillers of varying density and viscosity modifiers such as solvents, monomers, and polymers can be used to impart control of these properties. It is also beneficial to exclude oxygen from the environment in the mixing device before dispensing it on a substrate to minimize pre-mature curing and plugging of the mixing and dispensing device.

The electrically conductive curable organic and organosilicon containing compositions of the invention are useful for preparing electrically conductive rubbers, electrically conductive tapes, electrically conductive curable adhesives, electrically conductive foams, and electrically conductive pressure sensitive adhesives. The conductive curable compositions are especially useful for preparing electrically conductive silicone adhesives. Electrically conductive silicone adhesives have numerous uses including die attach adhesives, solder replacements, and electrically conductive coatings and gaskets. In particular, electrically conductive silicone adhesives are useful for bonding electronic components to flexible or rigid substrates.

The electrically conductive curable compositions can also be used for the assembly of electronic components, as substitutes for soldering, as electrical and thermal interface materials, and as conductive inks. The conductive curable compositions can be in the form of a rigid part or a flexible elastomer, and can be dispensed, pre-cured in rolls or sheet form as films, such as pressure sensitive adhesives. They can also be dispensed and cured in place in the final application. Foamed electrically conductive curable compositions can be used as gaskets and seals in applications such as electrical and electronic housings to prevent the transmission of electromagnetic and radio frequency noise across the sealed areas.

The thermally conductive curable organic and organosilicon containing compositions are similarly useful for preparing thermally conductive rubbers, thermally conductive tapes, thermally conductive curable adhesives, thermally conductive foams, and thermally conductive pressure sensitive adhesives. The conductive curable compositions are especially useful for preparing thermally conductive silicone adhesives. Thermally conductive silicone adhesives have several uses including their use as die attach adhesives, solder replacements, and thermally conductive coatings and gaskets. Thermally conductive silicone adhesives are especially useful for bonding electronic components to flexible or rigid substrates.

Thermally conductive curable compositions can also be used for assembling electronic components, as substitutes for soldering, as thermal interface materials, and as thermally conductive inks or greases. The conductive curable compositions can be in the form of a rigid part or in the form of a flexible elastomer and can be dispensed, pre-cured in rolls or in sheets as films, such as pressure sensitive adhesives. They can also be displaced and cured in place in the final application. Partially cured thermally conductive compositions can be used as thermally conductive greases. Foamed thermally conductive compositions can be used as gaskets and seals in electrical and electronic housings. When the conductive curable composition is a thermally conductive adhesive, the conductive curable composition offers particular advantages as a thermal interface material to provide good bonding strength between heat sinks, heat spreaders, or heat dissipation devices, particularly where the heat sink or heat dissipation device has a polymeric-matrix.

EXAMPLES

The following examples are set forth in order to illustrate the invention in more detail.

Example A

Measurement of the Electrical Conductivity/Volume Resistivity

The electrical conductivity reported in the Examples below was determined as a volume resistivity measurement using the standard protocol described in U.S. Pat. No. 6,361,716 (Mar. 26, 2002). Thus, the volume resistivity was determined using a Model 580 Micro ohm Meter of Keithley Instruments Incorporated, Cleveland, Ohio. The Meter was equipped with a four-point probe having spring-loaded, gold plated, spherical tips. A test specimen was prepared by first placing two strips of Scotch brand tape 0.25 cm apart on a glass microscope slide to form a channel extending along the length of the slide. An aliquot of the test conductive curable composition was deposited at one end of the slide and over the channel. The conductive curable composition to be analyzed was then spread over the entire channel by drawing a spatula through the conductive curable composition and across the surface at an angle of approximately 45°. The test specimen was allowed to cure at room temperature overnight for about 16 hours. The voltage drop between the two inner probe tips was then measured at a selected current to provide a resistance value in ohms ($\Omega$).

The initial volume resistivity of the cured composition was calculated using the equation $V=R(W\times T/L)$ where V is the volume resistivity in ohm centimeters ($\Omega$-cm), R is the resistance in ohms ($\Omega$) of the cured composition measured between two inner probe tips spaced 2.54 centimeter apart, W is the width of the cured layer in centimeters, T is the thickness of the cured layer in centimeters, and L is the length of the cured layer between the inner probes in centimeters. The thickness of the cured layer was determined using an Ames Model LG 3500-0-04 thickness gauge made by Testing Machines Incorporated, Ronkonkoma, N.Y. Volume resistivity in $\Omega$-cm units represents the average value of three measurements each performed on identically prepared test specimens. These measurements have a relative error of less than 10 percent.

Comparative Example 1

To a Hauschild mixing cup was added 10.71 parts by weight of a resin/polymer blend, 0.77 parts of glycerol, 0.85 parts of a catalyst, 1.35 parts of an adhesion promoter, 0.53 parts of a solution containing 3 parts of 2-phenyl-3-butyn-2-ol dissolved in 97 parts of the adhesion promoter, and 0.80 parts of a crosslinking agent. This matrix was mixed for 24 seconds before adding 85 parts by weight of a fatty acid lubricated silver flake filler (RA-127) from American Chemet Corporation, Chicago, Ill. The matrix was mixed again for 24 seconds. The matrix mixture was allowed to cool for 5 minutes before being mixed an additional 24 seconds.

The resin/polymer blend was a mixture of (i) 31 percent by weight of an organopolysiloxane resin containing $CH_2=CH(CH_3)_2SiO_{1/2}$ units, $(CH_3)_3SiO_{1/2}$ units, and $SiO_{4/2}$ units. The mole ratio of the $CH_2=CH(CH_3)_2SiO_{1/2}$ units and the $(CH_3)_3Si_{1/2}$ units compared to the $SiO_{4/2}$ units was about 0.7. The resin in the blend had a weight-average molecular weight of about 22,000, a polydispersity of about 5, and it contained about 1.8 percent by weight or about 5.5 mole percent of vinyl groups. The remainder of the blend contained (ii) 67 percent by weight of a dimethylvinylsiloxy-terminated polydimethylsiloxane having a viscosity of about 2 Pa·s at 25° C.

The catalyst was a mixture of 40 percent by weight of a complex of platinum and 1,3-divinyl-1,1,3,3-tetramethyldisiloxane. The complex was dispersed in a thermoplastic silicone resin containing 78 mol percent of monophenylsiloxane units and 22 mol percent of dimethylsiloxane units. The resin had a softening point of 80-90° C. The remainder of the catalyst mixture consisted of 55 percent by weight of a dimethylvinylsiloxy-terminated polydimethylsiloxane having a viscosity of about 2 Pa·s at 25° C., and 5 percent by weight of hexamethyldisilazane treated fumed silica. The catalyst had a platinum content of about 0.16 percent.

The adhesion promoter was vinyltrimethoxytetramethylpentasiloxane $ViMe_2SiO(Me_2SiO)_3Si(OMe)_3$. The crosslinking agent was a trimethylsiloxy-terminated polymethylhydrogensiloxane having a viscosity of about 30 mm²/s containing about 1.6 percent of silicon-bonded hydrogen atoms.

Example 1

To 12 parts by weight of a methacryloxypropyl dimethylsilyl terminated polydimethylsiloxane (PDMS) having a number average molecular weight ($M_n$) of about 13,000, was added 85 parts by weight of the silver flake filler used in the previous example. The two materials were mixed in a Hauschild mixer for 24 seconds. Three parts by weight of tri-n-butylborane methoxypropylamine (TNBB-MOPA) complex was added to the mixture. The headspace of the mixing cup was purged with argon gas and then mixed for two 24-second mixing cycles. The results are shown in Table 1.

TABLE 1

| Example | Cure | Initial Resistivity (Ω-cm) | Volume Resistivity (Ω-cm) One Week at 150° C. |
|---|---|---|---|
| Comp. Example 1 | 2 hours at 150° C. | 3.6E−04 | 4.0E−04 |
| Example 1 | 16 hours at RT | 1.4E−04 | 2.6E−04 |

As can be seen in Table 1, comparable levels of electrical conductivity can be achieved by room temperature (RT) curing the electrically conductive composition of Example 1 as with a heat cured platinum based electrically conductive composition having a similar filler content and loading. At room temperature, the electrically conductive composition of Comparative Example 1 did not cure.

Comparative Example 2

14 parts by weight of a vinyl terminated polydimethylsiloxane with a number average molecular weight ($M_n$) of about 23,000; 0.24 parts by weight of a trimethylsiloxy-terminated polydimethylmethylhydrogensiloxane having an average of three dimethylsiloxane units and five methylhydrogensiloxane units per molecule and containing 0.8 percent silicon-bonded hydrogen atoms; and 85 parts by weight of the silver flake filler used in the previous example, were mixed in a Hauschild mixer for 24 seconds. To the mixture was added (i) 0.801 parts by weight of a platinum catalyst containing one percent by weight of a platinum (IV) complex of 1,1-diethenyl-1,1,3,3-tetramethyldisiloxane; (ii) 92 percent by weight of a dimethylvinylsiloxy-terminated polydimethylsiloxane having a viscosity of 0.45 Pa·s at 25° C.; and (iii) 7 percent by weight of tetramethyldivinyldisiloxane. The mixture was mixed again for two 24-second mixing cycles.

Example 2

10.8 parts by weight of a methacryloxypropyldimethylsilyl-terminated PDMS with an $M_n$ of about 13,000, and 85 parts by weight of the silver flake filler of the previous example were mixed in a Hauschild mixer for 24 seconds. To the mixture was added 4.2 parts by weight of triethylborane complexed with 1.4 molar equivalents of N-(2-aminoethyl)-3-aminopropyl trimethoxysilane. The headspace of the mixing cup was purged with argon gas and then mixed for two 24-second mixing cycles. The results are shown in Table 2. As can be seen in Table 2, comparable, and even better, i.e., higher, levels of electrical conductivity can be achieved by the electrically conductive composition of the invention that was cured at room temperature, relative to a room temperature hydrosilylation cured composition of similar filler content and loading.

TABLE 2

| Example | Cure | Initial Resistivity (Ω-cm) | Volume Resistivity (Ω-cm) One Week at 150° C. |
|---|---|---|---|
| Comp. Example 2 | 16 hours/RT | 3.5E−01 | 3.2E−02 |
| Example 2 | 16 hours/RT | 3.0E−03 | 7.0E−03 |

Example B

Thermal Conductivity Measurement

Thermally conductive compositions were evaluated with a laser flash method using a Holometrix Microflash 300 instrument from Netzsch Instruments, Inc., Boston, Mass. To test the bulk thermal conductivity of a composition, a sample is formed by casting the composition into a one millimeter thick film, using a stainless steel doctor blade and allowing the film to cure. The cured film is then diced to into 8±0.13 millimeter square pads and coated on both sides with graphite. The coating is applied to increase energy absorption and emittance from the specimen surface. The laser flash method involves rapidly heating one side of the sample film a single pulse from a laser, and monitoring the arrival of the resulting temperature disturbance, as a function of time on the opposite surfaces. The technical details of this method generally correspond to ASTM's Test Method E 1461 that is a Standard Test Method for Thermal Diffusivity by the Flash Method Results of the evaluations are shown in Table 3.

Comparative Example 3

The composition used in this example was an alumina filler blend, hydrosilylation curable, thermally conductive adhesive, that is generally representative of a family of thermally conductive adhesive materials commercially available from the Dow Corning Corporation, Midland, Mich. This composition was a one-part, low flow, rapidly heat curable, highly thermally conductive adhesive, having a viscosity/flowability of about 58,000 mPa·s (centipoise), and a thermal conductivity of 1.9 Watt/meter-K at 25° C./77° F. A test composition of the adhesive was obtained, and tested according to the protocol in Example B. The curing conditions used during the test were 2 hours at 120° C. The test results are shown in Table 3.

Example 3

11.0 parts by weight of a methacryloxypropyl dimethylsilyl terminated PDMS with an $M_n$ of about 8,200 g/mol, 1.5 parts by weight of isophorone diisocyanate, and 85.0 parts of a filler blend containing 50 percent by weight of spherical alumina with an average particle size of 20 µm and 50 percent by weight irregularly shaped alumina with an average particle size of 2.2 µm, were mixed with a Hauschild mixer for 20 seconds. The filler type and the loading were similar to that used in Comparative Example 3. To the mixture was added 2.9 parts by weight of triethylborane complexed with 1.1 molar equivalents of 3-aminopropyltrimethoxysilane, and mixed with a Hauschild mixer for 20 seconds. The headspace of the cup was purged with argon gas, and then mixing was continued for another 20 seconds. On exposure to air, the composition became unworkable within 2 minutes of its exposure to air. A portion of the composition was then tested according to the protocol of Example B except that the test composition was allowed to cure at room temperature for 16 hours. The test results are shown in Table 3.

Example 4

A composition similar to Example 3 was prepared using an acrylic monomer. Parts A and B each contained 4.3 parts of a methacryloxypropyl dimethylsilyl terminated PDMS with an $M_n$ of about 8,200 g/mol and 42.3 parts of the filler blend used in Example 3. To Part A was added 2.9 parts by weight of triethylborane complexed with 1.1 molar equivalents of 3-aminopropyltrimethoxysilane. To Part B was added 1.5 parts by weight of isophorone diisocyanate, and 1.5 parts 2-ethylhexylmethacrylate, and Part B was mixed for 24 seconds in a Hauschild mixer. Both parts were then mixed for another 24 seconds in the Hauschild mixer. Equal weights of Parts A and B were then combined in a plastic mixing cup under argon and mixed for 24 seconds in the Hauschild mixer. Upon exposure to air, the composition became unworkable within 10 minutes, but the individual Parts A and B remained workable after storing overnight in air at room temperature. A portion of the composition was then tested according to the protocol of Example B except that the test composition was allowed to cure at room temperature for 16 hours. The test results are shown in Table 3.

TABLE 3

| Example | Cure Conditions | Thermal Conductivity (W/m-K) |
| --- | --- | --- |
| Comparative Example 3 | 2 h/120° C. | 1.8 |
| Example 3 | 16 h/RT | 2.2 |
| Example 4 | 16 h/RT | 2.3 |

As can be seen in Table 3, comparable or higher levels of thermal conductivity were achieved by compositions of the invention when the composition was cured at room temperature, relative to hydrosilylation cured compositions containing similar filler contents and loadings that were prepared at higher temperatures. Example 4 shows that stable two part formulations can be prepared and cured rapidly at room temperature to form thermally conductive compositions. Example 4 also demonstrates that the inclusion of an acrylic monomer along with the methacrylate terminated PDMS as component (i) did not hinder the thermal conductivity and even extended the working time.

Example C

Amine Compound Effect on Curing Characteristics

The effect of an amine compound on the curing characteristics of adhesive compositions was evaluated by casting test compositions into slabs of about 2 millimeter thickness and monitoring the slabs by probing the slabs with a metal spatula. Working time was determined as the point at which the test composition was no longer flowable when subjected to a shearing motion by the spatula. Rub-off was determined as the transfer of the polymer or the filler to a nitrile rubber glove, following application of light finger pressure on the surface of the test composition. Rub-off and Final Form were observed after leaving the test compositions overnight at room temperature, and the results are shown in Table 4.

Comparative Example 4

5 parts by weight of 3-aminopropyltriethoxysilane was added to 95 parts by weight of the composition of Comparative Example 1. The composition was then heated for one hour at 150° C. Upon cooling to room temperature, the composition remained uncured. After 16 hours at room temperature, the composition thickened into a granular paste that had little or no cohesive strength. The results are shown in Table 4.

Comparative Example 5

5 parts by weight of 3-aminopropyltriethoxysilane was added to 95 parts by weight of the composition of Comparative Example 2. The composition was then heated for one hour at 150° C. Upon cooling to room temperature, the composition remained uncured. After 16 hours at room temperature, the composition thickened into a dry granular paste that had little or no cohesive strength. The results are shown in Table 4.

Comparative Example 6

5 percent by weight of 3-aminopropyltriethoxysilane was added to the composition of Comparative Example 3 prior to mixing. The composition was then heated for one hour at 150° C. Upon cooling to room temperature, the composition remained uncured. After 16 hours at room temperature, the composition thickened into a dry granular paste that had little or no cohesive strength. The results are shown in Table 4.

Example 5

85 parts by weight of the silver flake filler used in Comparative Example 1 was added to 5.5 parts by weight of a methacryloxypropyl dimethylsilyl terminated PDMS with an $M_n$ of about 8,200, and mixed with a Hauschild mixer for 24 seconds. To this mixture was added a mixture containing (i) 4.2 parts by weight of triethylborane complexed with 1.4 molar equivalents of N-(2-aminoethyl)-3-aminopropyltrimethoxysilane, and (ii) 5 parts by weight of 3-aminopropyltriethoxysilane. The headspace of the cup was purged with argon gas, and then the composition was mixed for two more 24 second mixing cycles. This example is similar to Example 2, except for the addition of 5 percent by weight of 3-aminopropyltriethoxysilane. The results are shown in Table 4.

Example 6

5 parts by weight of 3-aminopropyltriethoxysilane was added to 95 parts by weight of the composition of Example 3. The order of addition was changed such that the catalyst and 3-aminopropyltriethoxysilane were added together to the polymer and filler before the addition of the isocyanate decomplexing agent. Upon exposure to air, the composition remained workable for 10 minutes before curing into a well-crosslinked solid. The results are shown in Table 4.

TABLE 4

| Example | Cure Condition | Working Time @ 23° C. | Final Form | Rub-off |
|---|---|---|---|---|
| Comparative Example 1 | 1 hour/150° C. | Indefinite | Well crosslinked solid | No |
| Comparative Example 2 | 23° C. | 5 minutes | Well crosslinked solid | No |
| Comparative Example 3 | 1 hour/150° C. | Indefinite | Well crosslinked solid | No |
| Comparative Example 4 | 1 hour/150° C. | Indefinite | Uncrosslinked granular paste | Yes |
| Comparative Example 5 | 23° C. | >1 hour | Uncrosslinked granular paste | Yes |
| Comparative Example 6 | 1 hour/150° C. | Indefinite | Uncrosslinked granular paste | Yes |
| Example 2 | 23° C. | 6 minutes | Well crosslinked solid | No |
| Example 3 | 23° C. | 1 minutes | Well crosslinked solid | No |
| Example 5 | 23° C. | 20 minutes | Well crosslinked solid | No |
| Example 6 | 23° C. | 10 minutes | Well crosslinked solid | No |

As shown in Table 4, when Examples 5 and 6 are considered relative to Examples 2 and 3, it can be seen that the addition of amine compounds to the compositions of the invention introduces benefits such as increased working time to the compositions. In contrast, when Comparative Examples 4-6 are considered relative to Comparative Examples 3-5, it can be seen that the addition of comparable levels of the same amine compounds negatively influence the properties of these hydrosilylation-curable compositions through cure inhibition.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method for preparing a conductive curable composition comprising combining and mixing ingredients comprising:
   A. 1-50 parts by weight of a free radical polymerizable monomer, oligomer or polymer (i);
   B. 0.1-50 parts by weight of an organoborane amine complex (ii) sufficient to cure the composition, the amount depending on the molecular weight of the complex and the number of boron atoms per molecule; either
   C. 0.5-80 percent by volume of an electrically conductive filler (iii) based on the total volume of the conductive curable composition sufficient to impart electrical conductivity to the curable composition; or
   C. 25-96 percent by weight of a thermally conductive filler (iii) based on the total weight of the conductive curable composition sufficient to impart thermal conductivity to the curable composition;
   D. greater than 0 to 50 parts by weight of an amine reactive compound having amine reactive groups (iv) sufficient to decomplex boron depending on the molecular weight of the compound;
   E. 0 to 50 parts by weight of a component capable of generating gas (v) when mixed with a compound bearing active hydrogen and a catalyst; and
   F. 0 to 50 parts by weight of any optional ingredient(s); based on the total weight of the conductive curable composition;
   wherein the amine reactive compound (iv) is present; and the electrically or thermally conductive filler (iii) is treated with the amine reactive compound (iv).

2. A method according to claim 1 wherein the free radical polymerizable monomer, oligomer, or polymer (i) is an organic compound (a), an organosilicon monomer, oligomer, or polymer (b), or (c) a mixture of difunctional organopolysiloxanes and hexafunctional organopolysiloxanes, in which (a), (b), and (c) are unsaturated and capable of undergoing free radical polymerization.

3. A method according to claim 1 wherein the organoborane amine complex (ii) is a complex formed between an organoborane and an amine compound, the organoborane having the formula B—R"$_3$ where R" is a linear, branched, aliphatic, or aromatic hydrocarbon group containing 1-20 carbon atoms; and wherein the amine compound is an organic amine compound or a silicon containing amine compound.

4. A method according to claim 1 wherein the electrically conductive filler (iii) comprises a metal particle, a conductive non-metal particle, a metal particle having an outer surface of a metal, or a conductive non-metal particle having an outer surface of a metal; wherein the outer surface metal is selected from the group consisting of silver, gold, platinum, palladium, nickel, aluminum, copper, and steel; wherein the particles have an average particle size of 0.005-20 μm; and wherein the particles having an outer surface of a metal have an average particle size of 15-100 μm.

5. A method according to claim 4 wherein the particles having an outer surface of a metal have a core of particles selected from the group consisting of copper, solid glass, hollow glass, mica, nickel, ceramic fiber, polystyrene, and polymethylmethacrylate.

6. A method according to claim 1 wherein the thermally conductive filler (iii) comprises a metal particle, a metal oxide particle, a thermally conductive non-metal powder, or a combination thereof.

7. A method according to claim 6 wherein the thermally conductive filler (iii) is selected from the group consisting of aluminum, copper, gold, nickel, silver, alumina, magnesium oxide, beryllium oxide, chromium oxide, titanium oxide, zinc oxide, barium titanate, diamond, graphite, carbon nanoparticles, silicon nanoparticles, boron nitride, aluminum nitride, boron carbide, titanium carbide, silicon carbide, tungsten carbide, and combinations thereof.

8. A method according to claim 1 wherein the amine reactive compound (iv) is a compound having amine reactive groups and is selected from the group consisting of mineral acids, Lewis acids, carboxylic acids, carboxylic acid derivatives, carboxylic acid metal salts, isocyanates, aldehydes, epoxides, acid chlorides, and sulphonyl chlorides.

9. A method according to claim 8 wherein the amine reactive groups are borne by an organic molecule, an organosilane, an organopolysiloxane, an organotitanate, or an organozirconate.

10. A method according to claim 8 wherein the amine reactive compound (iv) is attached to solid particles selected from the group consisting of ground silica, precipitated silica, calcium carbonate, carbon black, carbon nanoparticles, silicon nanoparticles, barium sulfate, titanium dioxide, aluminum oxide, boron nitride, silver, gold, platinum, palladium, nickel, aluminum, copper, and steel.

11. A method according to claim 1 further comprising a component capable of generating a gas (v) when mixed with a compound bearing active hydrogen and a catalyst, the component (v) being a silicon hydride functional compound; the compound bearing active hydrogen being water, an alcohol, or a carboxylic acid; and the catalyst being platinum, a platinum group metal, tin, titanium, or zirconium.

12. A method according to claim 1 wherein the organoborane amine complex (ii) is packaged separately from the amine reactive compound (iv).

13. A method according to claim 1 wherein the electrically or thermally conductive filler (iii) treated with the amine reactive compound (iv) is packaged together in one part that is separate from the organoborane amine complex (ii).

14. A method according to claim 1 wherein the free radical polymerizable monomer, oligomer or polymer (i), the organoborane amine complex (ii), the electrically or thermally conductive filler (iii), and the amine reactive compound (iv) are packaged together in one part in a substantially oxygen free environment.

15. A method according to claim 1 wherein the free radical polymerizable monomer, oligomer or polymer (i), the organoborane amine complex (ii), and the electrically or thermally conductive filler (iii) are packaged together in one part.

16. An electrically conductive rubber, electrically conductive tape, electrically conductive adhesive, electrically conductive foam, or electrically conductive pressure sensitive adhesive, comprising as a component thereof, the cured product prepared by the method according to claim 1.

17. An electrically conductive rubber, electrically conductive tape, electrically conductive adhesive, electrically conductive foam, or electrically conductive pressure sensitive adhesive, according to claim 16 wherein the rubber, tape, adhesive or pressure sensitive adhesive are an electrically conductive silicone rubber, an electrically conductive silicone tape, an electrically conductive silicone adhesive, an electrically conductive silicone foam, or an electrically conductive silicone pressure sensitive adhesive.

18. A thermal interface material, thermally conductive rubber, thermally conductive tape, thermally conductive curable adhesive, thermally conductive foam, or thermally conductive pressure sensitive adhesive, comprising as a component thereof, the cured product prepared by the method according to claim 1.

19. A thermal interface material, thermally conductive rubber, thermally conductive tape, thermally conductive curable adhesive, thermally conductive foam, or thermally conductive pressure sensitive adhesive, according to claim 18, wherein the rubber, tape, adhesive or pressure sensitive adhesive are a silicone thermal interface material, a thermally conductive silicone rubber, a thermally conductive silicone tape, a thermally conductive silicone adhesive, a thermally conductive silicone foam, or a thermally conductive silicone pressure sensitive adhesive.

20. A composite article of manufacture comprising a substrate coated with a composition prepared by a method comprising:
combining and mixing ingredients comprising:
A. 1-50 parts by weight of a free radical polymerizable monomer, oligomer or polymer (i);
B. 0.1-50 parts by weight of an organoborane amine complex (ii) sufficient to cure the composition, the amount depending on the molecular weight of the complex and the number of boron atoms per molecule; either
C. 0.5-80 percent by volume of an electrically conductive filler (iii) based on the total volume of the conductive curable composition sufficient to impart electrical conductivity to the curable composition; or
C. 25-96 percent by weight of a thermally conductive filler (iii) based on the total weight of the conductive curable composition sufficient to impart thermal conductivity to the curable composition;
D. great than 0 to 50 parts by weight of an amine reactive compound having amine reactive groups (iv) sufficient to decomplex boron depending on the molecular weight of the compound;
E. 0 to 50 parts by weight of a component capable of generating gas (v) when mixed with a compound bearing active hydrogen and a catalyst; and
F. 0 to 50 parts by weight of any optional ingredient(s); based on the total weight of the conductive curable composition,
wherein the amine reactive compound (iv) is present; and the electrically or thermally conductive filler (iii) is treated with the amine reactive compound (iv).

21. A composite article of manufacture according to claim 20 wherein the composition on the substrate is cured.

22. A composite article of manufacture comprising two or more substrates coated with a composition, and the composition is disposed between the substrates as a bond line of a fixed or a varying thickness, with the proviso that the composition is prepared by a method comprising:
combining and mixing ingredients comprising:
A. 1-50 parts by weight of a free radical polymerizable monomer, oligomer or polymer (i);
B. 0.1-50 parts by weight of an organoborane amine complex (ii) sufficient to cure the composition, the amount depending on the molecular weight of the complex and the number of boron atoms per molecule; either
C. 0.5-80 percent by volume of an electrically conductive filler (iii) based on the total volume of the conductive curable composition sufficient to impart electrical conductivity to the curable composition; or C. 25-96 percent by weight of a thermally conductive filler (iii) based on the total weight of the conductive curable composition sufficient to impart thermal conductivity to the curable composition;
D. great than 0 to 50 parts by weight of an amine reactive compound having amine reactive groups (iv) sufficient to decomplex boron depending on the molecular weight of the compound;
E. 0 to 50 parts by weight of a component capable of generating gas (v) when mixed with a compound bearing active hydrogen and a catalyst; and
F. 0 to 50 parts by weight of any optional ingredient(s); based on the total weight of the conductive curable composition;
wherein the amine reactive compound (iv) is present; and the electrically or thermally conductive filler (iii) is treated with the amine reactive compound (iv).

23. A composite article of manufacture according to claim 22 wherein the composition disposed between the substrates is cured.

* * * * *